J. F. RIESGRAF.
HORSE-HOPPLE.

No. 183,210.  Patented Oct. 10, 1876.

UNITED STATES PATENT OFFICE.

JOHN F. RIESGRAF, OF COPIAPO, CHILI.

IMPROVEMENT IN HORSE-HOPPLES.

Specification forming part of Letters Patent No. 183,210, dated October 10, 1876; application filed August 14, 1876.

*To all whom it may concern:*

Figure 1:
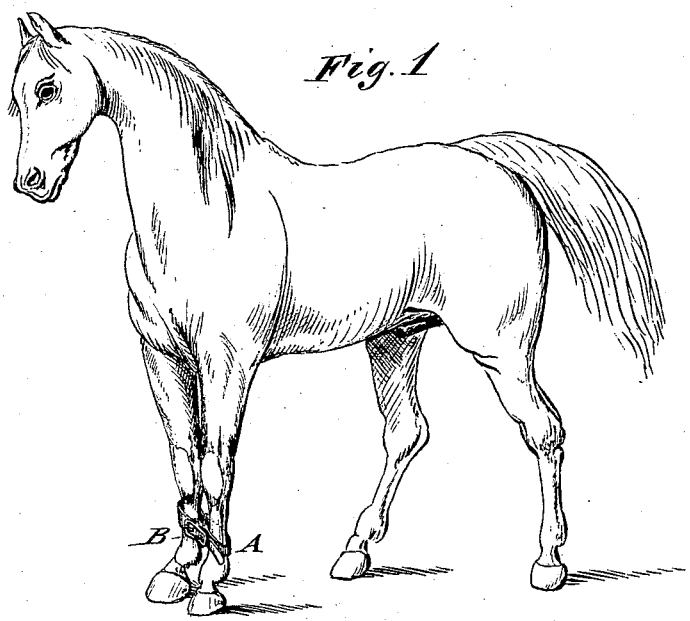
Figure 2:
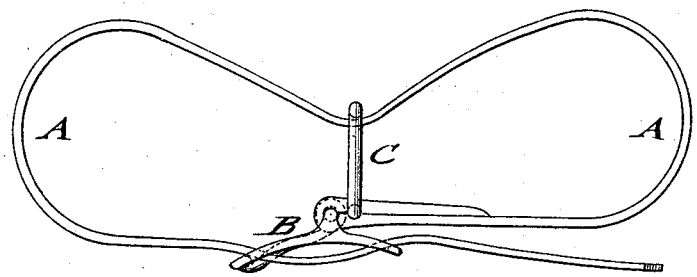

Be it known that I, JOHN F. RIESGRAF, of Copiapo, Republic of Chili, have invented a new and Improved Horse-Hopple, of which the following is a specification:

Figure 1 represents a horse fettered with my improved hopple, and Fig. 2 is a detail top view of the hopple.

Similar letters of reference indicate corresponding parts.

My invention relates to an improved device for fettering the fore feet of horses, in place of hitching them by the bridle-strap to a post or weight; and the invention consists of a strap fastened by a buckle and intermediate link or loop to the fore feet of the horse above the ankles.

In the drawing, A represents a leather strap of suitable length, capable of being applied in such a manner around the fore feet of a horse that they are brought closely together. The strap is applied by a buckle, B, and connected intermediately between the feet by a loop or link, C, that is secured to the end to which the buckle is attached, the strap being drawn through the loop when applied around the fore feet, so as to fasten each foot individually, and prevent the escape or use of the fore feet without, however, bruising or injuring them.

The horse is by the hopple fettered in such a manner that there is no chance of its running away when frightened, it forming a reliable fettering device, by which the different hitching devices may be entirely dispensed with, and a safer and more reliable device substituted in their place.

Having thus described my invention, I claim as new and desire to secure by Letters Patent—

A horse-hopple composed of the strap A, with the fastening-buckle B and the intermediate link C, arranged as shown and described, for the purpose specified.

JOHN F. RIESGRAF.

Witnesses:
PAUL GOEPEL,
C. SEDGWICK.